United States Patent [19]
Bump

[11] Patent Number: 5,667,268
[45] Date of Patent: Sep. 16, 1997

[54] PROTECTIVE DOOR FOR SERVICE COMPARTMENT

[76] Inventor: Durwin L. Bump, 1544 18th St., Mitchell, Nebr. 69357

[21] Appl. No.: 491,177

[22] Filed: Jun. 16, 1995

[51] Int. Cl.$^6$ ................................................ B60P 7/02
[52] U.S. Cl. .............................. 296/100; 296/36; 296/56; 296/183
[58] Field of Search .................................. 296/203, 183, 296/180, 37.6, 36, 39.1, 146.8, 56, 100, 99.1; 52/205, 639, 690, 653.1, 290; 292/268, 272, 276; 49/36

[56] References Cited

U.S. PATENT DOCUMENTS

| D. 276,326 | 11/1984 | Bell, Jr. ........................ 296/100 X |
|---|---|---|
| 4,247,145 | 1/1981 | Groene ........................... 296/164 |
| 4,650,165 | 3/1987 | Siemann ...................... 296/56 X |
| 4,811,680 | 3/1989 | Genth .......................... 114/201 R |
| 5,071,180 | 12/1991 | Wiedehage et al. ............. 292/268 |
| 5,321,924 | 6/1994 | Smolik .......................... 52/205 |
| 5,449,213 | 9/1995 | Kiley et al. ................... 296/56 |

OTHER PUBLICATIONS

Product Brochure (Exhibit D of Parent Application), Photocopy (5 pages), Reading Bodyworks, Inc., Reading, Pa Unknow.

Product Brochure, (Exhibit E of Parent Application), Photocopy, The Knapheide Mfgr. Co., Quincy, IL Unknow.

*Primary Examiner*—David M. Mitchell
*Assistant Examiner*—Kia M. Robinson
*Attorney, Agent, or Firm*—John O. Mingle

[57] ABSTRACT

A multi-purpose door for a service compartment having several locking open positions which protects the contents of the compartment when closed, offers some protection for the person using the compartment from the weather when open, and further allows when open, effective storage use of the overhead roof area of the compartment. Under adverse conditions a waterproof material is attached to further protect the person.

9 Claims, 3 Drawing Sheets

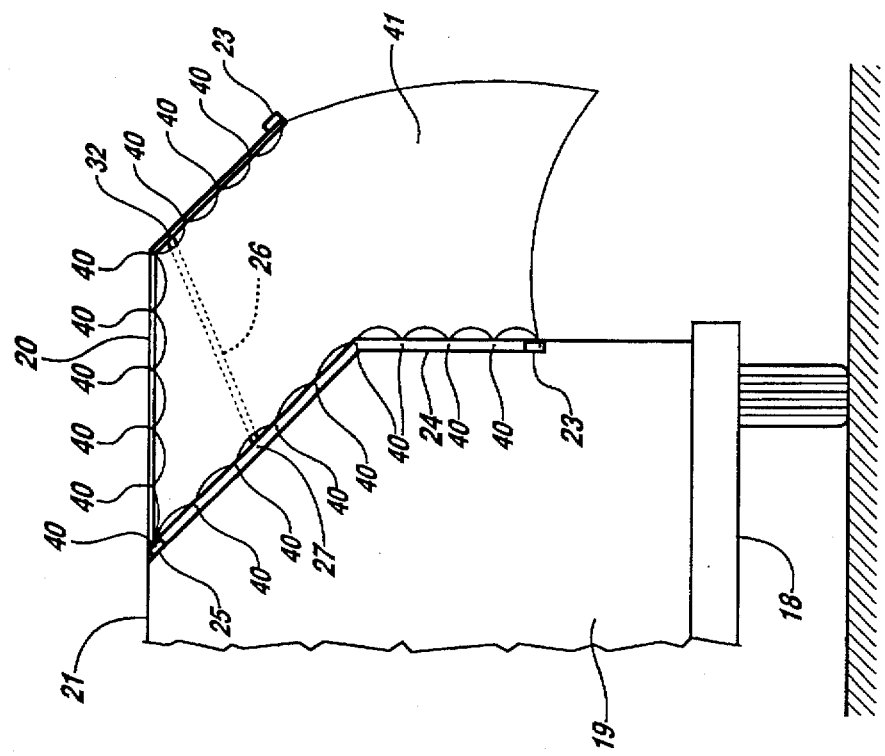
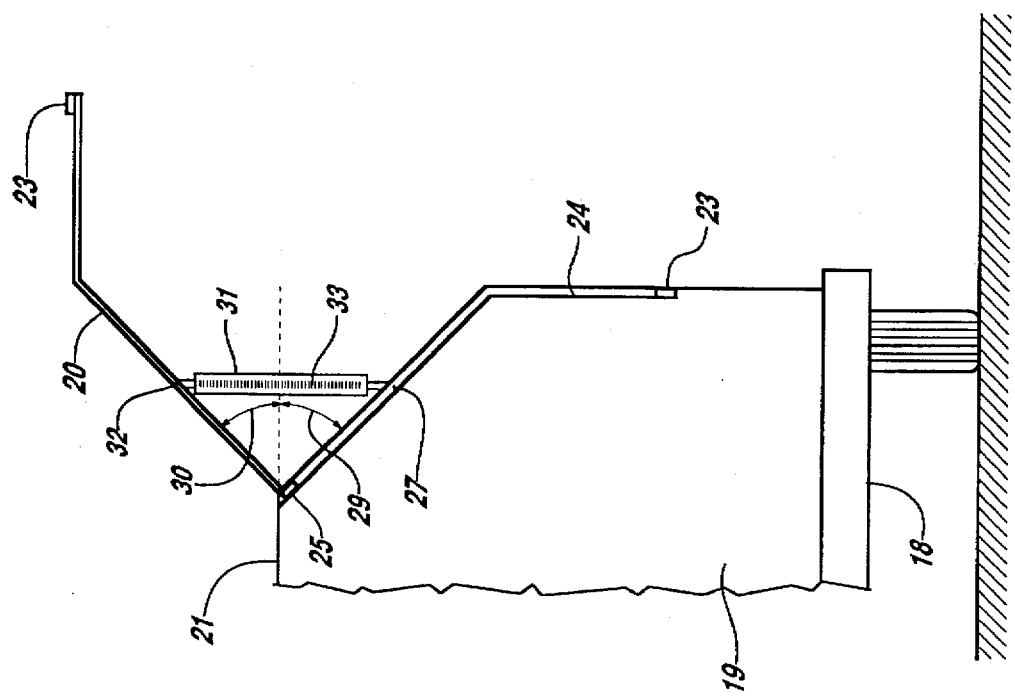

PROTECTIVE DOOR FOR SERVICE COMPARTMENT

BACKGROUND OF INVENTION

1. Field of Invention.

The present invention relates to a protective door with auxiliaries for a firmly-mounted service compartment.

2. Background.

Service compartments are a common way of life for many companies that utilize field representatives. When mounted on a vehicle they often are referred to as service bodies since they represent a typical redesign of a pickup or van into spaces where various components, tools, equipment, parts, etc., are stored. Further service compartments are found at construction sites where they are often trailer mounted, but are additionally found utilized on any firm base, such as a concrete pad.

In recent times the use of several sizes of pickups has occurred, and in particular the mini-pickup has a bed size that is convenient for a proper sized service compartment that is firmly so fastened to said bed.

In some instances service compartments or systems are completely internal to a vehicle such as a van; however, in many cases when mounted on truck beds access to service compartments is from the outside often through some form of door. These service compartment doors come in various configurations from ones analogous to kitchen cupboard doors to ones that appear designed after a garage door.

Additionally a class of doors is sometimes considered that open like the trunk of a car, that is, the latch at the bottom with top hinges and lift upright. Of course, a car trunk door is either closed or fully open. Such a door if designed for a service compartment interferes with the roof portion and prevents it being utilized for additional storage, such as for ladders, poles, tall equipment, etc. The subject invention overcomes this problem.

Another difficulty with many service compartments is the weather since they are employed with external entry. Rain, hail, snow, wind, etc., impede a persons ability to effectively utilize said service compartment when the door is open. The subject invention partially overcomes this problem by providing a door that is protective overhead and can improve protection on the sides with a weather screen if necessary, and in addition when the door is closed, it well protects the interior of the service compartment.

Recent United States patents appropriate to the subject invention include:

| No. | Inventor | Year |
| --- | --- | --- |
| D 276,326 | Bell, Jr. | 1984 |
| 5,071,180 | Wiedehage et al. | 1991 |
| 5,321,924 | Smolik | 1994 |

Referring to the above list, the Bell design patent discloses a gull wing type of door for a compartment where said door extends above the roof line, and where the roof is horizontal over the door opening when the door is closed. This design of Bell prohibits use of the roof for the handling of large items.

Wiedehage et al. disclose an arresting device for a hinged component such as a roof hatch which fixes said component in a position when a gate and peg are aligned. A brace for a service compartment door is potentially designed using this concept.

Smolik discloses wall assembly made from U-shaped support channels. Service compartments are potentially framed using this concept.

SUMMARY OF INVENTION

It is an object of the present invention to overcome the deficiencies of the previous prior art by having a multi-purpose door for a service compartment containing several locking open positions which protects the contents of said compartment when closed, offers some protection for the person using said compartment from the weather when open, and further allows when open effective storage use of the overhead roof area of said compartment. Under adverse conditions a weather screen is attached between the open door and the service compartment to further protect said individual and compartment.

BRIEF DESCRIPTION OF THE DRAWINGS

FIG. 4 shows a cutaway of a service compartment with the protective door raised up to near a wide open position.

FIG. 5 shows a cutaway of a service compartment with the protective door raised up and further protected by a weather screen.

DETAILED DESCRIPTION OF INVENTION

Figure 1:
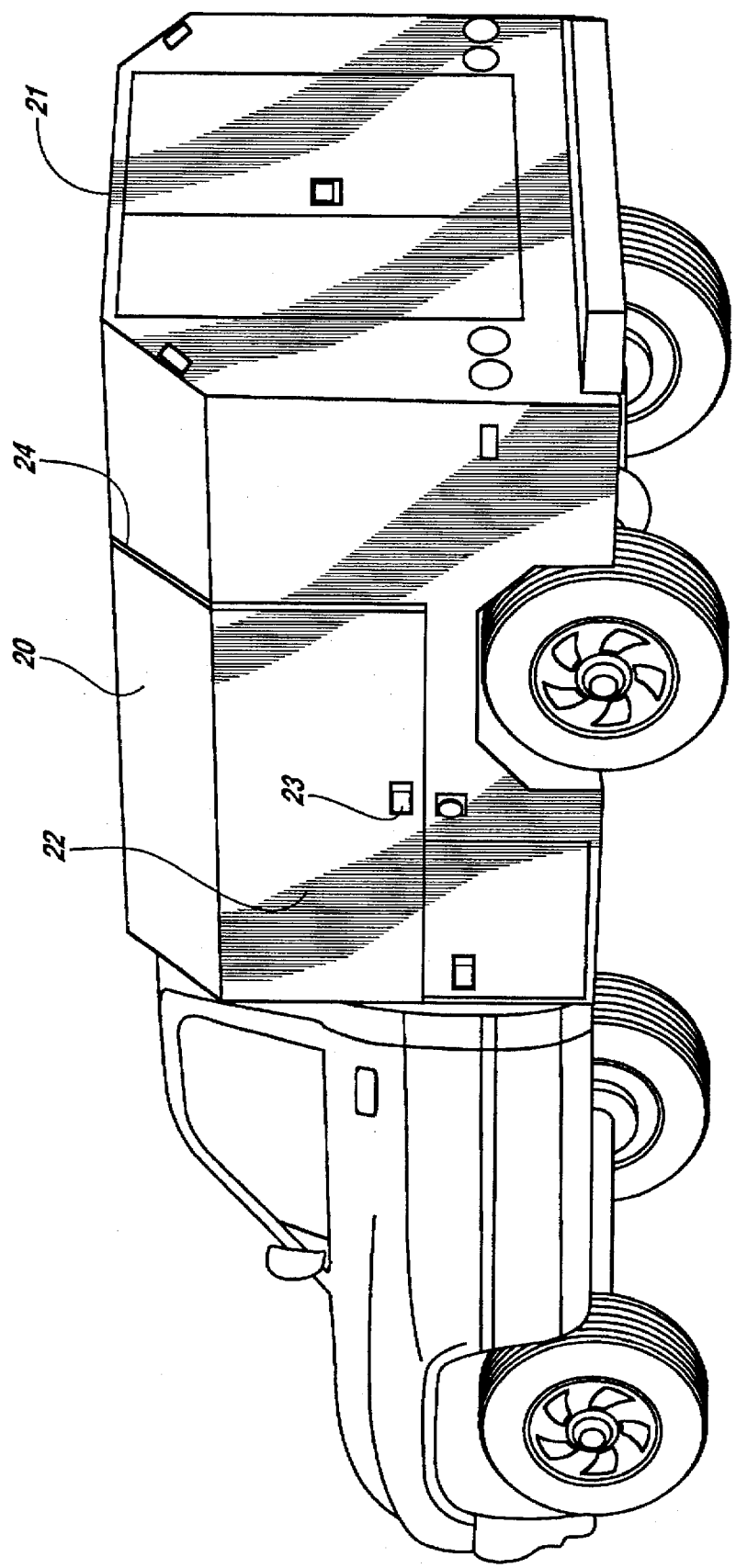
FIG. 1 shows a truck mounted service compartment having a closed side door.

FIG. 1 shows a truck mounted service compartment with a side door using the slanted roof of the subject invention. Here 20 is the slanted portion of the door while 22 is the vertical portion of the door, shown in the closed position with latch 23. The roof 21 is horizontal and under the proper configuration is used for storage of long items, but not shown here. In this closed position the door seal 24 protects the service compartment from weather intrusion.

A protective door system and its complementary box-type structurally-secure service compartment mounted on a firm base, which comprises a slanted roof as a modification of said service compartment on a door side wherein said angle of slant is between about 30 and 60 degrees below horizontal and represents no more than one-third of the total roof area. Further it has a structurally-secure door opening as a modification of said service compartment on a door side wherein said opening extends from within two feet of the horizontal roof to a location along the vertical wall of said service compartment, and a structurally-secure protective door fitting into said door opening matched with a weather-type seal, fastened with hinges overhead at its junction with the roof, and secured with a latch at its junction with the vertical wall, wherein said door was made with the same dimensions and slant angle as the slanted roof and vertical side openings. Finally it has a pivoting brace attached in a structurally-secure manner between said protective door and said service compartment to allow multiple open door positions, and said brace pivots at its service compartment attachment. Here the maximum raised position of the upper slanted portion of said protective door allowance is no more than about 60 degrees above the horizontal.

The subject invention is useable on any type of firm base that supports the service compartment, such as but not limited to, a truck flat bed, a pickup bed, a construction trailer, a table, or a concrete pad. FIG. 1 shows it on a truck bed.

The phrase "structurally-secure," as used here and in the claims, means that the object of concern is made structurally strong enough to accomplish the functionality required of it, such as but not limited to, utilizing sufficiently sturdy material, multiple layers of lighter material, sturdy supports, multiple supports, sturdy fasteners, multiple fasteners, etc. Thus the structurally-secure service box is potentially made of any sufficiently strong material, such as but not limited to, fiberglass, finished wood, plywood, metal, composites, plastics, and natural material.

The slanted portion of the roof is required to utilize more efficiently the roof area for holding large, often long, items, such as but no limited to, ladders, poles, beams, and doors. Thus structurally-secure brackets extending over the slanted portion of the roof and firmly attached to the horizontal portion of said roof are employed. Therefore a ladder is placeable directly over the slanted roof on these brackets. However, in this configuration where the protective door is hinged to the horizontal roof said door is only raised so that the door's slanted portion is no more than horizontal, and this provides maximum use of the roof area for storage. A further configuration allows the protective door to hinge no more than about two feet below said horizontal roof, and in this case said door is raised until the door's slanted portion meets the horizontal extension of said roof. In the situation where roof storage is not a concern, the protective door in any configuration is raised until the slanted portion is no more than 60 degrees above the horizontal; however, often because of wind problems this inclination angle is reduced to nearer 30 degrees.

Another configuration is to allow the service compartment sides as well as the protective door to have slightly rounded walls resulting in a stronger design.

A further configuration is utilizing a brace which has a locking mechanism whereby said door cannot move upwards or downwards, and in such cases the attachment of said brace to said door is by a sliding mechanism or other length-changing connection built into said brace. This is necessary in situations where the weight of the door is insufficient to firmly hold the door steady, such as under high wind conditions or where said door is likely hit by some other object. Further under another configuration the brace comprises a force compression member that helps raise said protective door since the member is compressed when the door is closed. A further advantage of such a brace locking mechanism is that it allows multiple open door positions, and such selection of said positions gives a protective overhead cover by said door to an individual using said service compartment. This is convenient during inclement weather as it not only keeps the individual drier, but also keeps the items in the service box more free from moisture. Of course, in the closed, latched, and if necessary locked, position the protective door keeps the inner part of the service box sealed away from the elements as well as other persons.

Figure 2:
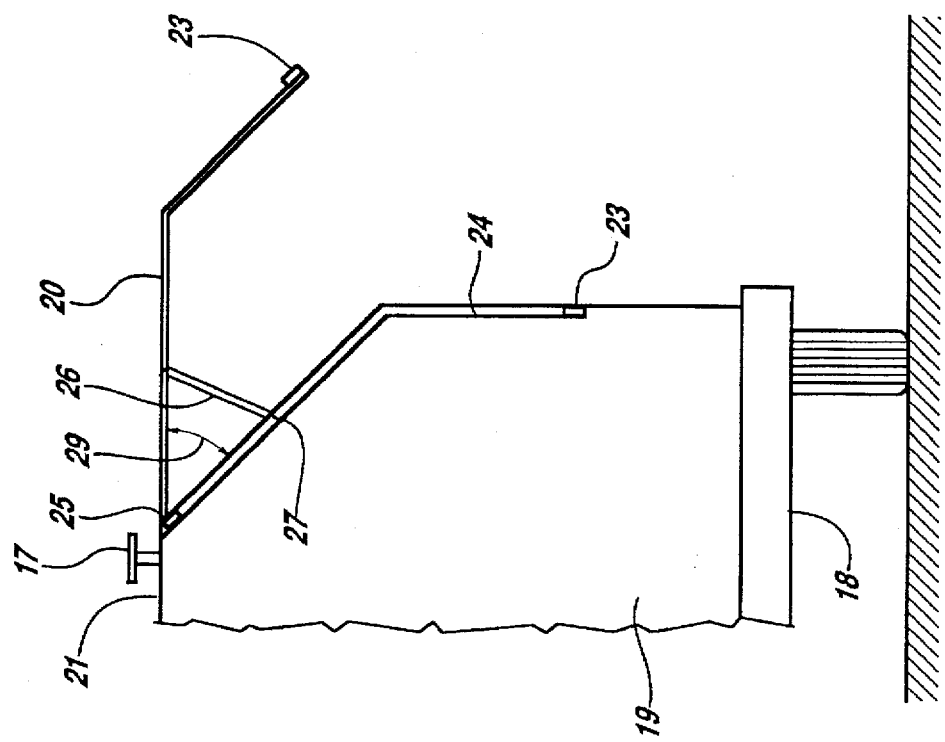
FIG. 2 shows a cutaway of a service compartment with the protective door raised.

FIG. 2 shows a cutaway of the service compartment 19 on a truck bed 18 with the protective door 20 open to the horizontal roof-line 21 position. The brace 26 pivots about its service compartment attachment 27. The door is hinged 25 with a structurally-secure connection between the door and the service compartment. The angle 29 is the angle of slant for the roof after modification. The latch 23 is in the open position. The structurally-secure roof storage bracket 17 mounts on the horizontal roof area 21.

Figure 3:
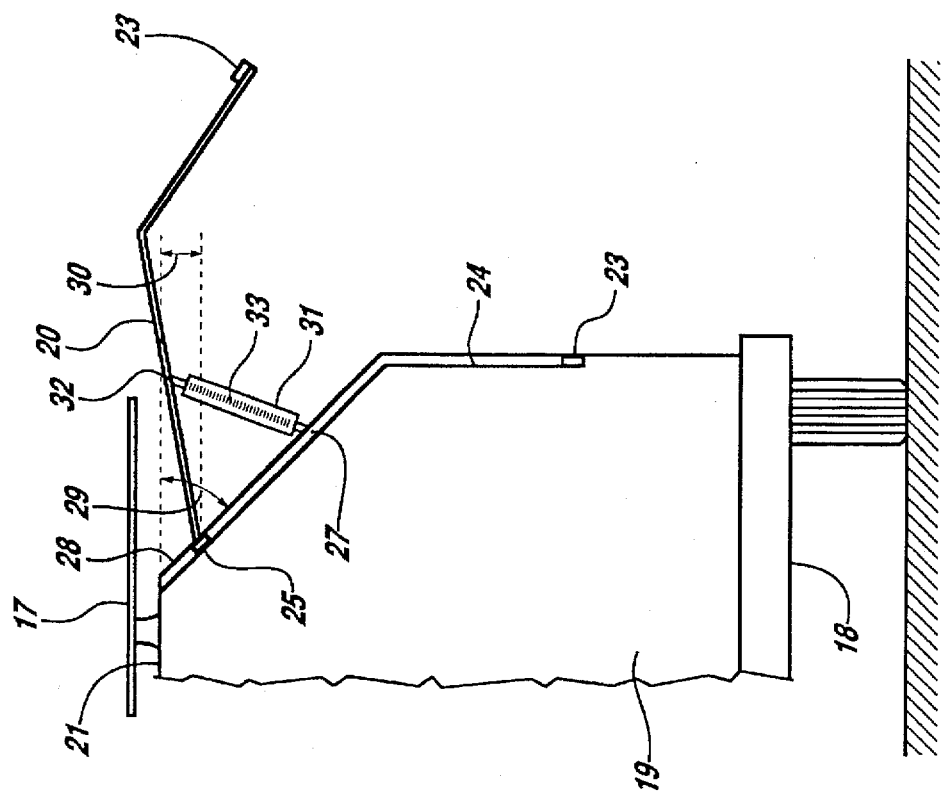
FIG. 3 shows a cutaway of a service compartment with the protective door mounted below the roof line and raised up to the roof storage bracket.

FIG. 3 shows a modified configuration of FIG. 2 where the door hinge 25 is attached a distance 28, no more than two feet, below the horizontal roof-line 21. The angle 30 is the maximum raised position of the upper slanted portion of said protective door allowance and is no more than about 60 degrees above the horizontal; however, in FIG. 2 the door is raised only to the horizontal roof-line 21 level to allow roof storage. The structurally-secure roof storage bracket 17 is shown extended over the slanted roof region; however, the brace need not be over the door but is potentially located on either side of the door and still support a ladder or long object that does extend over said door. The brace 31 now pivots at the connection with the service compartment 27 and the connection with the door 32 and has a combined length-changing mechanism along with a force compression member 33 built inside said brace 31. Said length-changing mechanism can be, but is not limited to, parts that slide or telescope over each other, a spiral spring member, or a piston-cylinder arrangement; further these can potentially serve as force compression members 33. This force compression member 33 is compressed in the closed door position and then helps raise the door when unlatched. Further FIG. 3 has other identified items the same as FIG. 2.

FIG. 4 shows a modified configuration of FIG. 2 where roof storage is of no concern; therefore, the door is raised to a higher position. The angle 30 is the above horizontal position of the open door. The brace 31 contains the force compression member 33, same as in FIG. 3, pivoting at its attachment 27 with the service compartment and with its attachment 32 with the door. Further FIG. 4 has other identified items the same as FIG. 2.

In another configuration there is an auxiliary sheet of waterproof material fastened to the edge of said door and said door opening to provide protection from wind-blown matter, such as but not limited to, rain, snow, hail, dirt, leaves, or plants.

Here the waterproof material is any flexible substance, such as but not limited to, canvas, plastic, treated cloth, woven strips, or light metal. The fastening mechanism is any convenient method, such as but not limited to, snaps, hooks, rivets, staples, thread, Velcro, buttons and eyes, bolts and eyes, and eyes and rope. Here Velcro is a trademark for a nylon tape fastening mechanism built into separate pieces of nylon fabric where one has hooks and the other dense pile. Said waterproof material is potentially foldable into the service compartment without unfastening when the protective door is lowered and latched.

FIG. 5 shows a modified configuration of FIG. 2 where the waterproof material 41 or weather screen hangs below the opened protective door 20 and is fastened 40 in multiple positions on said door edge and said service compartment opening edge both being located inside of the door seal space. In practice this allows the waterproof material to fold into the service compartment without being unfastened. Further FIG. 5 has other identified items the same as FIG. 2.

A protective door used in conjunction with a box-type structurally-secure service compartment which is made with a slanted roof on a door side wherein said angle of slant is between about 30 and 60 degrees below horizontal and represents no more than one-third of the roof area. Said compartment is further mounted on a firm base, which comprises a structurally-secure protective door which fits with a weather-type seal into a door opening cut into said service compartment from within two feet of said horizontal roof and extending down to a vertical wall position. It is fastened with hinges overhead at its junction with the roof, and secured with a latch at its junction with the vertical wall, wherein said door was made with the same roof slant angle. A force compression member brace attached in a structurally-secure manner pivots at its connections with said service compartment and said door and has a length-changing connection with multiple locking positions, wherein the maximum raised position of the upper slanted portion of said protective door allowance is no more than about 60 degrees above the horizontal. The brace has a sliding mechanism to allow multiple open positions and is potentially forced compressed if needed. Further an auxiliary sheet of waterproof material is fastened between the edge of said door and said door opening to provide protection from wind-blown matter.

A weather screen used as an auxiliary for a service compartment door comprising a sheet of waterproof material sized to hang from the open door to about below the service compartment with a multiplicity of fasteners mounted on said screen which have a complementary mounting within said service compartment or said door, wherein said fasteners are inside said door seal, and connection of said complementary fasteners together to provide protection from wind-blown matter by said screen. Further said weather screen has the ability to fold into said service compartment without disconnecting said fasteners so as to closed said door. The weather screen has fasteners that are selected from the group consisting of snaps, hooks, rivets, staples, thread, Velcro, buttons and eyes, bolts and eyes, and eyes and rope. In particular Velcro makes a convenient fastener mechanism since it allows the weather screen to move from one side of the door to the other easily.

FIG. 5 further shows this weather screen 41 previously identified as only an auxiliary sheet of waterproof material.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A protective door system and its complementary box-type structurally-secure service compartment mounted on a firm base, which comprises:

a slanted roof as a modification of said service compartment wherein said slanted roof is between about 30 and 60 degrees below horizontal and represents no more than one-third of the total roof area, and wherein said slanted roof is positioned only on the side of said service compartment which contains said protective door;

a structurally-secure door opening as a modification of said service compartment wherein said opening extends from within two feet of the horizontal roof to a location along the vertical side wall of said service compartment;

a structurally-secure protective door fitting into said door opening matched with a weather-type seal, fastened with hinges overhead at its junction with the roof, and secured with a latch at its junction with the vertical wall, wherein said door was made with the same dimensions and slant angle as the slanted roof and vertical side openings; and a brace attached in a structurally-secure manner between said protective door and said service compartment to allow multiple open door positions that are no more than about 60 degrees above the horizontal, wherein said brace has a length-changing connection with multiple locking positions.

2. The protective door system according to claim 1 wherein said maximum raised position of the upper slanted portion of said protective door further comprises no more than a horizontal position whereby maximum storage use of the full roof region occurs.

3. The protective door system according to claim 1 wherein said slanted roof further comprises full storage on the total roof by using structurally-secure brackets firmly attached to the horizontal portion of said roof and extending over said slant roof portion.

4. The protective door system according to claim 1 wherein said multiple open door positions further comprise selection of said positions to give a protective overhead cover by said door to an individual using said service compartment.

5. The protective door system according to claim 1 further comprising an auxiliary sheet of waterproof material fastened between the edge of said door and said door opening to provide protection from wind-blown matter, wherein said sheet can fold into said door opening when said protective door is fully shut.

6. The protective door system according to claim 1 wherein said length-changing connection with multiple locking positions further comprises a locking force compression member.

7. A protective door used in conjunction with a box-type structurally-secure service compartment which is modified with a slanted roof only on said protective door side wherein said slanted roof is between about 30 and 60 degrees below horizontal and represents no more than one-third of the total roof area and said compartment is further mounted on a firm base, which comprises:

a structurally-secure protective door which fits with a weather-type seal into a door opening cut into said service compartment from within two feet of said horizontal roof and extending down to a vertical side wall position, fastened with hinges overhead at its junction with the roof, and secured with a latch at its junction with the vertical wall, wherein said door contains the same roof slant angle; and a brace attached in a structurally-secure manner between said protective door and said service compartment to allow multiple open door positions that are no more than about 60 degrees above the horizontal, wherein said brace has a length-changing connection with multiple locking positions.

8. The protective door according to claim 7 further comprising an auxiliary sheet of waterproof material fastened between the edge of said door and said door opening to provide protection from wind-blown matter, wherein said sheet can fold into said door opening when said protective door is fully shut.

9. The protective door system according to claim 7 wherein said length-changing connection with multiple locking positions further comprises a locking force compression member.

* * * * *